United States Patent
Feist et al.

(10) Patent No.: US 10,435,793 B2
(45) Date of Patent: Oct. 8, 2019

(54) THERMAL BARRIER COATINGS AND COATED COMPONENTS

(75) Inventors: Jörg Peter Feist, London (GB); John Rayment Nicholls, Buckinghamshire (GB)

(73) Assignee: Sensor Coating Systems Limited, Surrey (GB)

( * ) Notice: Subject to any disclaimer, the term of this patent is extended or adjusted under 35 U.S.C. 154(b) by 1626 days.

(21) Appl. No.: 12/937,310

(22) PCT Filed: Apr. 14, 2009

(86) PCT No.: PCT/GB2009/000960
§ 371 (c)(1),
(2), (4) Date: Jun. 2, 2011

(87) PCT Pub. No.: WO2009/125204
PCT Pub. Date: Oct. 15, 2009

(65) Prior Publication Data
US 2011/0236657 A1    Sep. 29, 2011

(30) Foreign Application Priority Data

Apr. 11, 2008 (GB) .................................. 0806614.4

(51) Int. Cl.
*C23C 28/00* (2006.01)
*B32B 7/023* (2019.01)
(Continued)

(52) U.S. Cl.
CPC ............ *C23C 28/3455* (2013.01); *B32B 7/02* (2013.01); *C23C 4/11* (2016.01); *C23C 4/134* (2016.01);
(Continued)

(58) Field of Classification Search
CPC .......................... C23C 30/00; C23C 28/00–44
(Continued)

(56) References Cited

U.S. PATENT DOCUMENTS

| 6,015,630 A | 1/2000 | Padture et al. |
| 6,106,959 A | 8/2000 | Vance et al. |

(Continued)

FOREIGN PATENT DOCUMENTS

| DE | 10200803 A | 7/2003 |
| WO | 2000/006796 | 2/2000 |

(Continued)

OTHER PUBLICATIONS

Yang et al. "Role of Y4Al2O9 in High Temperature Oxidation Resistance of NiCoCrAlY—ZrO2:Y2O3 Coatings". Journal of Materials Science & Technology, vol. 23, No. 4, (2007); pp. 568-570.*

(Continued)

*Primary Examiner* — Prashant J Khatri
(74) *Attorney, Agent, or Firm* — Renner, Otto, Boisselle & Sklar, LLP

(57) ABSTRACT

A component coated with a thermal barrier coating (TBC), wherein the TBC includes an outer surface layer and at least one underlying layer, wherein the outer surface layer has a thickness of not more than 50% of a thickness of the TBC, has a lower average porosity than the at least one underlying layer and includes an additional phase therewithin.

10 Claims, 5 Drawing Sheets

(51) Int. Cl.
*C23C 4/11* (2016.01)
*C23C 4/134* (2016.01)
*B32B 7/02* (2019.01)

(52) U.S. Cl.
CPC ....... *C23C 28/321* (2013.01); *Y10T 428/2495* (2015.01); *Y10T 428/31504* (2015.04)

(58) Field of Classification Search
USPC ............ 428/212–213, 215, 217, 220, 304.4, 428/310.5, 312.8, 316.6, 688–689, 698, 428/701–702, 704, 699, 544, 566, 428/627–686, 332, 337, 469–471, 428/472.1–472.2
See application file for complete search history.

(56) References Cited

U.S. PATENT DOCUMENTS

| | | | |
|---|---|---|---|
| 6,294,260 | B1 | 9/2001 | Subramanian |
| 6,387,539 | B1* | 5/2002 | Subramanian ................ 428/633 |
| 6,677,064 | B1 | 1/2004 | Subramanian |
| 6,703,137 | B2* | 3/2004 | Subramanian ................ 428/469 |
| 6,875,529 | B1* | 4/2005 | Spitsberg ............. C04B 35/486 416/241 B |
| 2007/0036997 | A1* | 2/2007 | Floyd et al. .................. 428/472 |

FOREIGN PATENT DOCUMENTS

| | | |
|---|---|---|
| WO | 2003/057941 | 7/2003 |
| WO | WO 2007/023293 A2 * | 3/2007 |

OTHER PUBLICATIONS

Clarke, D. R. et al., "Thermal Barrier Coating Materials", materialstoday, 8 (6), pp. 22-29, 2005.

Gentleman, M. M. et al., "Concepts for Luminescence Sensing of Thermal Barrier Coatings", Surface and Coatings Technology, 188-189, pp. 93-100, 2004.

Guo, H. et al., "Microstructure Investigation on Gradient Porous Thermal Barrier Coating Prepared by EB-PVD", Scripta Materialia, 44 (4), pp. 683-687, 2001.

Lakiza, S. et al., "Phase Diagram of the $ZrO_2$—$Gd_2O_3$—$Al_2O_3$ System", Journal of the European Ceramic Society, 26 (3), pp. 233-246, 2006.

Ma, W. et al., "Thermal Cycling Behavior of Lanthanum-Cerium Oxide Thermal Barrier Coatings Prepared by Air Plasma Spraying", Key Engineering Materials, 336-338, pp. 1759-1761, 2007.

Ma, W. et al., "Novel Thermal Barrier Coatings based on $La_2Ce_2O_7$/8YSZ Double-Ceramic Layer Systems Deposited by Electron Beam Physical Vapor Deposition", Surface and Coatings Technology, 202 (12), pp. 2704-2708, 2007.

Matsumoto, M. et al., "Low Thermal Conductivity and High Temperature Stability of $ZrO_2$—$Y_2O_3$—$La_2O_3$ Coatings Produced by Electron Beam PVD", Scripta Materialia, 50 (6), pp. 867-871, 2004.

Padture, N. P. et al., "Low Thermal Conductivity in Garnets", Journal of the American Ceramic Society, 80 (4), pp. 1018-1020, 1997.

Patankar, S. N. et al., "Processing of Yttrium-Aluminum Garnets under Non-Equilibrium Conditions", Journal of Alloys and Compounds, 353 (1-2), pp. 307-309, 2003.

Su, Y. J. et al., "Thermal Conductivity, Phase Stability and Oxidation Resistance of $Y_3Al_5O_{12}$ (YAG)/$Y_2O_3$—$ZrO_2$ (YSZ) Thermal-Barrier Coatings", Oxidation of Metals, 61 (3-4), pp. 253-271, 2004.

Wu, Y. et al., "Novel Deposition of Columnar $Y_3Al_5O_{12}$ Coatings by Electrostatic Spray-Assisted Vapor Deposition", Journal of the American Ceramic Society, 89 (1), pp. 385-387, 2006.

* cited by examiner

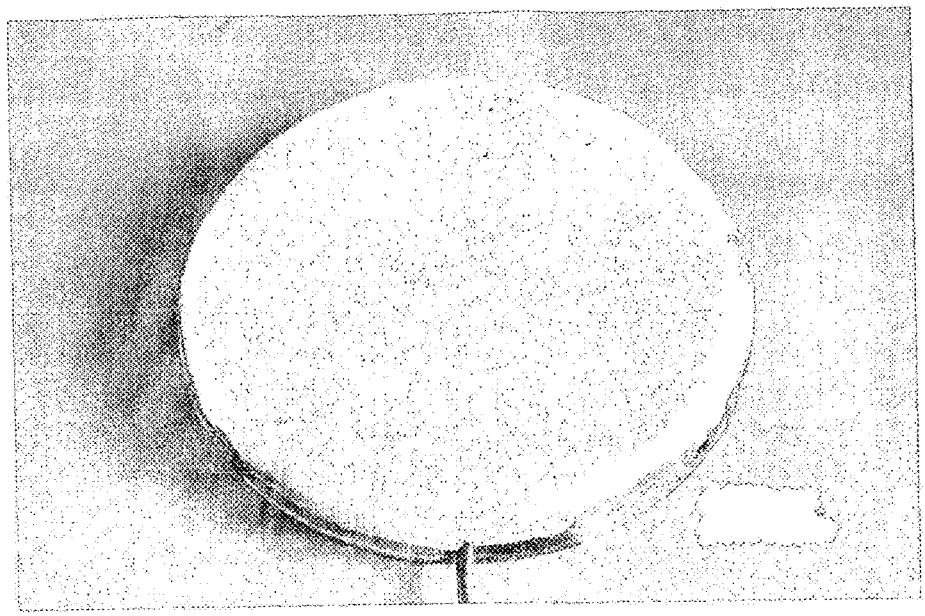
Fig. 1
Fig. 2
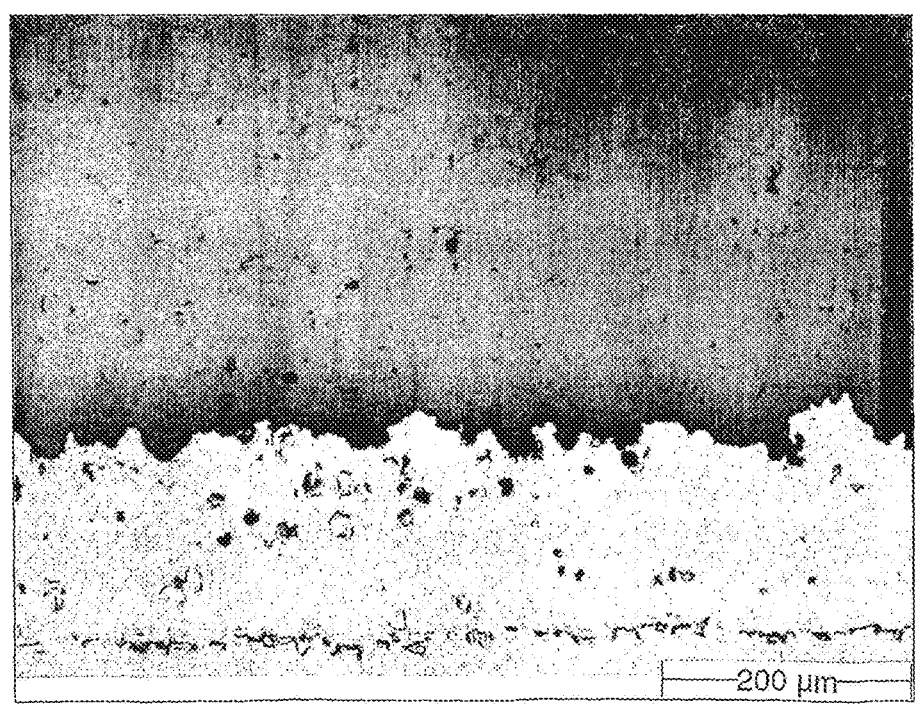

Probenfläche: 17629,30 µm²
Flächenanteil: 3,92 %
Objektdichte: 0,01 1/µm²
Max. Durchmesser: 13,18 µm

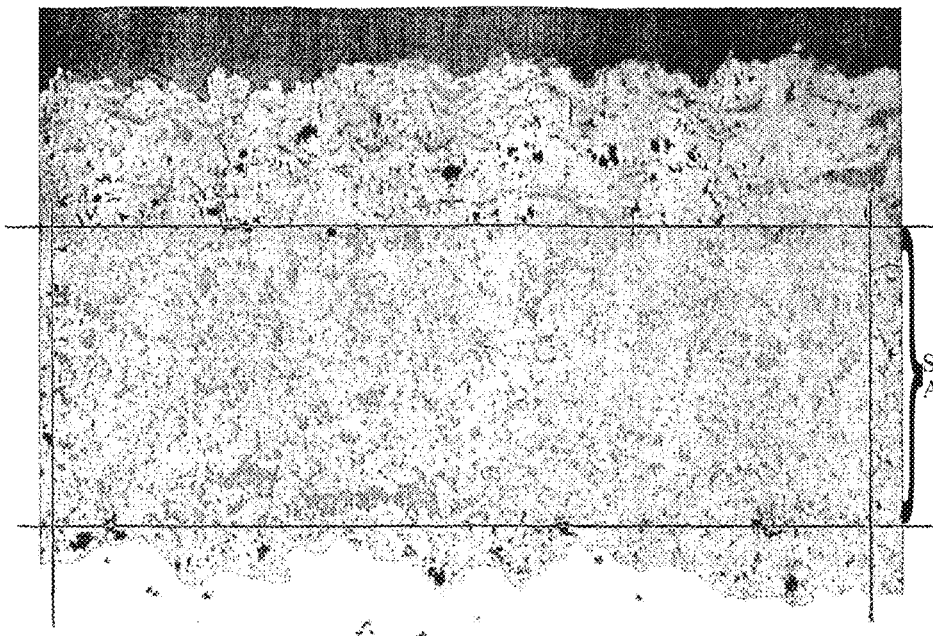
Probenfläche: 95886,42 µm²
Flächenanteil: 14,97 %
Objektdichte: 0,02 1/µm²
Max. Durchmesser: 24,11 µm
Fig. 7
Fig. 8
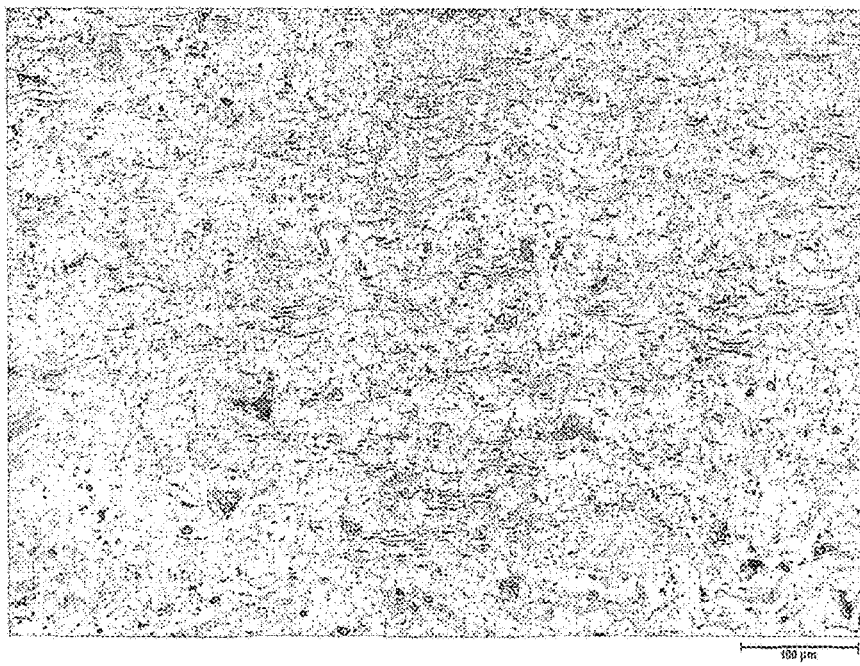

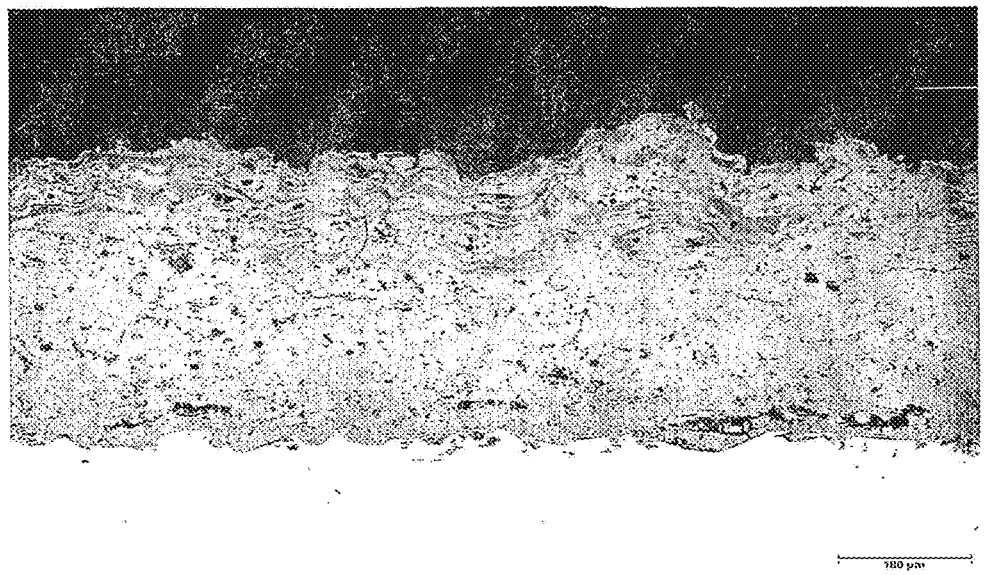
Fig. 9
Fig. 10
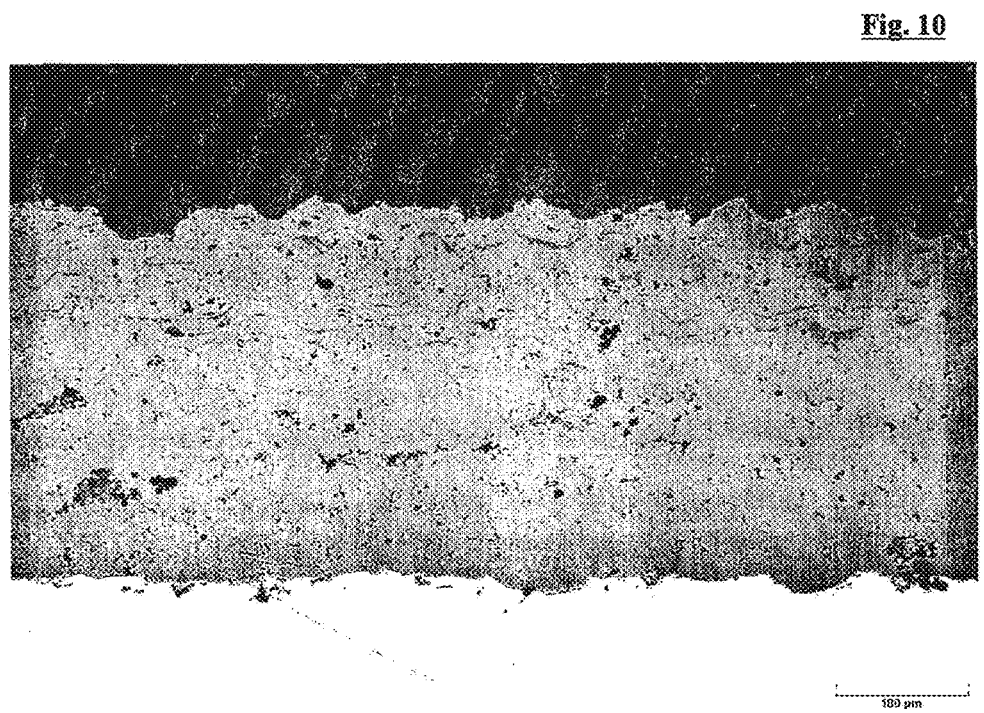

THERMAL BARRIER COATINGS AND COATED COMPONENTS

FIELD OF THE INVENTION

The present invention relates to thermal barrier coatings (TBCs), in particular for use in high-temperature environments, and components coated with such TBCs.

BACKGROUND OF THE INVENTION

TBCs are structural coatings applied to components, which are subjected to high temperatures, often greater than 1000 C, and thus would be prone inter alia to oxidation and corrosion processes. Typical applications are in the aviation and power generation industries, particularly in the coating of turbine components, such as turbine blades, liners, tiles, etc.

Existing TBCs are predominantly formed from yttria stabilized zirconia (YSZ), though other ceramic materials, such as pyrochlores, are now being considered.

Turbine components which are exposed to elevated temperatures are usually made of temperature-resistant nickel or cobalt based superalloy materials. These materials are usually coated with a bondcoat, typically a platinum alumide, platinum diffused or MCrAlY alloy, which provides for growth of a protective alumina layer, which is then covered by a ceramic TBC, which typically is made of stabilized zirconia, for example, 8 wt % yttria stabilized zirconia.

Other materials have emerged for TBCs, such as ceria stabilised zirconia, scandium stabilised zirconia or other rare earth oxide stabilised zirconias.

TBCs function by conferring reduced thermal conductivity, which, with cooling of the underlying component, reduces the thermal impact on the component material. TBCs typically provide for operation at surface temperatures of 1200 C, which would otherwise lead to premature failure.

TBCs are usually deposited using either a physical evaporation method, e.g. EBPVD, or an air plasma spray (APS) method. Physical evaporation methods provide for the formation of columnar structures on the bondcoat, which are extremely strain tolerant. Air plasma spraying is more cost effective and provides for very porous coating structures, which reduce the thermal conductivity of the TBC.

The dominant failure mechanism of TBCs is delamination, owing to oxidation of the bondcoat. Under thermal load, the bondcoat oxidizes, and an oxide layer grows at the bondcoat-TBC interface. The rate of oxidation is dependent upon temperature and increases with increasing temperature. The growth of this oxide layer results in additional stresses, which cause the formation of cracks, which grow parallel to the bondcoat-TBC interface, leading to spallation and finally to delamination of the TBC.

Failure of TBCs is also promoted as a result of sintering of the surface of the TBC. Sintering will occur when the material of the TBC is exposed to temperatures above predeterminable temperatures. For example, sintering of YSZ occurs when exposed to temperatures above 1200 C. These temperatures are predicted for future turbines, which aim for higher efficiencies by running at higher temperatures, and are already experienced in current engines, for example, in the combustion chambers.

Sintering of the surface of the TBC causes the formation of a surface layer which is much denser than the underlying bulk of the TBC, which does not experience the high surface temperatures. This structure of dense, sintered material overlying an as-deposited sub-surface material results in a TBC with reduced strain tolerance. Under a thermal gradient and cycling conditions, this lack of strain tolerance will cause cracking, which will start at material interfaces and grains, such as at pores. Once these cracks have formed, the cracks will grow and penetrate the surface area until parts of the surface of the TBC spallate. This spallation results in thinning of the TBC, which in turn provides for reduced thermal insulation, leading to an increase in the temperature of the bondcoat and accelerated growth of the oxide layer at the bondcoat-TBC interface, leading eventually to delamination of the entire coating.

Further, failure of TBCs can be promoted as a result of volume changes which occur as a result of phase transformations. For example, in YSZ, high-temperature cycling can cause the YSZ to form small amounts of the monoclinic phase, which has a different volume than the original t' or cubic phase. The monoclinic phase forms within the t' or cubic phase, leading to increased stresses, and eventually cracking as described above.

In general, sintering or volume changes in TBCs, which occur as a result of high-temperature exposure, in combination with frequent cycling, cause damage to the TBC, leading to crack formation. Thus, the consideration to date in developing TBCs has been in developing materials which have a reduced tendency to sinter at high temperatures and a reduced tendency to form additional phases, typically through the use of phase stabilisers.

SUMMARY OF THE INVENTION

In one aspect the present invention provides a component coated with a thermal barrier coating (TBC), wherein the TBC includes an outer surface layer and at least one underlying layer, wherein the outer surface layer has a thickness of not more than 50% of a thickness of the TBC, has a lower average porosity than the at least one underlying layer and includes an additional phase therewithin.

In one embodiment the outer surface layer comprises a zirconia based phase, preferably a zirconia based oxide.

In one embodiment the outer surface layer comprises yttria stabilized zirconia (YSZ).

In another embodiment the outer surface layer comprises a zirconate pyrochlore ($A_2Zr_2O_7$), where A is preferably one or more elements from the lanthanide series (La→Lu).

In one embodiment the outer surface layer comprises one of $La_2Zr_2O_7$, $Nd_2Zr_2O_7$, $Sm_2Zr_2O_7$ or $Gd_2Zr_2O_7$.

In a further embodiment the outer surface layer comprises a pyrochlore ($A_2B_2O_7$), where A is preferably one or more elements from the lanthanide series (La→Lu) or the actinide series (Ac→Lr) and B is preferably one or more elements from the group of transition metals.

In one embodiment the outer surface layer comprises $La_2Ce_2O_7$.

In a still further embodiment the outer surface layer comprises a magnetoplumbite ($AB_{1+x}C_xAl_{11-2x}O_{19}$), where A is preferably one or more elements from La→Gd, B is preferably one or more elements from Mg, Sr, and Mn→Zn, C is preferably one or more of Ti and Si, and 0<x<5.5.

In one embodiment the outer surface layer comprises $LaMgAl_{11}O_{19}$.

In a yet further embodiment the outer surface layer comprises a monazite ($APO_4$), where A is at least one of La, Ce, Pr, Nd, Th and Y.

In one embodiment the outer surface layer comprises $LaPO_4$.

In still another embodiment the outer surface layer comprises a garnet.

In one embodiment the outer surface layer comprises a yttrium aluminium garnet (YAG) ($Y_3Al_xFe_{5-x}O_{12}$), where $0<x<5$, and optionally Fe can be replaced partially or entirely by one or more transition metals, including Cr.

In one embodiment the outer surface layer comprises $Y_3Al_5O_{12}$.

In another embodiment the outer surface layer comprises a gadolinium aluminium garnet (GAG) ($Gd_3Al_xFe_{5-x}O_{12}$), where $0<x<5.5$, and optionally Fe can be replaced partially or entirely by one or more transition metals, including Cr.

In one embodiment the outer surface layer comprises $Gd_3Al_5O_{12}$.

In yet still another embodiment the outer surface layer comprises a perovskite.

In one embodiment the outer surface layer comprises a yttrium aluminium perovskite (YAP) ($YAl_xFe_{1-x}O_3$), where $0<x<1$, and optionally Fe can be replaced partially or entirely by one or more transition metals, including Cr.

In one embodiment the outer surface layer comprises $YAlO_3$.

In another embodiment the outer surface layer comprises a gadolinium aluminium perovskite (GAP) ($GdAl_xFe_{1-x}O_3$), where $0<x<1$, and optionally Fe can be replaced partially or entirely by one or more transition metals, including Cr.

In one embodiment the outer surface layer comprises $GdAlO_3$.

In yet another embodiment the outer surface layer comprises a monoclinic.

In one embodiment the outer surface layer comprises a yttrium aluminium monoclinic (YAM) ($Y_4Al_xFe_{2-x}O_9$), where $0<x<2$, and optionally Fe can be replaced partially or entirely by one or more transition metals, including Cr.

In one embodiment the outer surface layer comprises $Y_4Al_2O_9$.

In another embodiment the outer surface layer comprises a gadolinium aluminium monoclinic (GAM) ($Gd_3Al_xFe_{2-x}O_9$), where $0<x<2$, and optionally Fe can be replaced partially or entirely by one or more transition metals, including Cr.

In one embodiment the outer surface layer comprises $Gd_4Al_2O_9$.

In one embodiment the outer surface layer has an average porosity of less than 10%.

In one embodiment the outer surface layer has an average porosity of less than 5%.

In one embodiment the at least one underlying layer has an average porosity of more than 10%.

In one embodiment the at least one underlying layer has an average porosity of more than 15%.

In one embodiment the outer surface layer has a thickness of at least 2% of a thickness of the TBC.

In one embodiment the outer surface layer has a thickness of at least 5% of a thickness of the TBC.

In one embodiment the outer surface layer has a thickness of at least 10% of a thickness of the TBC.

In one embodiment the outer surface layer has a thickness of at least 20% of a thickness of the TBC.

In one embodiment the outer surface layer has a thickness of at least 30% of a thickness of the TBC.

In one embodiment the outer surface layer has a thickness of at least 40% of a thickness of the TBC.

In one embodiment the outer surface layer has a thickness of at least 50% of a thickness of the TBC.

In one embodiment the outer surface layer has a thickness of at least 15 µm.

In one embodiment the outer surface layer includes between 0.1 wt % and 50 wt % of the additional phase.

In one embodiment the outer surface layer includes between 1 wt % and 30 wt % of the additional phase.

In one embodiment the outer surface layer includes between 5 wt % and 25 wt % of the additional phase.

In one embodiment the outer surface layer includes between 10 wt % and 20 wt % of the additional phase.

In one embodiment the additional phase comprises a yttrium/aluminium based phase, preferably a yttrium/aluminium based oxide.

In one embodiment the additional phase comprises a yttrium aluminium garnet (YAG) ($Y_3Al_xFe_{5-x}O_{12}$), where $0<x<5$, and optionally Fe can be replaced partially or entirely by one or more transition metals, including Cr.

In one embodiment the additional phase comprises $Y_3Al_5O_{12}$.

In another embodiment the additional phase comprises a yttrium aluminium perovskite (YAP) ($YAl_xFe_{1-x}O_3$), where $0<x<1$, and optionally Fe can be replaced partially or entirely by one or more transition metals, including Cr.

In one embodiment the additional phase comprises $YAlO_3$.

In a further embodiment the additional phase comprises a yttrium aluminium monoclinic (YAM) ($Y_4Al_xFe_{2-x}O_9$), where $0<x<2$, and optionally Fe can be replaced partially or entirely by one or more transition metals, including Cr.

In one embodiment the additional phase comprises $Y_4Al_2O_9$.

In another embodiment the additional phase comprises a rare earth/aluminium based phase, preferably a rare earth/aluminium based oxide.

In one embodiment the additional phase comprises a gadolinium aluminium garnet (GAG) ($Gd_3Al_xFe_{5-x}O_{12}$), where $0<x<5.5$, and optionally Fe can be replaced partially or entirely by one or more transition metals, including Cr.

In one embodiment the additional phase comprises $Gd_3Al_5O_{12}$.

In another embodiment the additional phase comprises a gadolinium aluminium perovskite (GAP) ($GdAl_xFe_{1-x}O_3$), where $0<x<1$, and optionally Fe can be replaced partially or entirely by one or more transition metals, including Cr.

In one embodiment the additional phase comprises $GdAlO_3$.

In a further embodiment the additional phase comprises a gadolinium aluminium monoclinic (GAM) ($Gd_3Al_xFe_{2-x}O_9$), where $0<x<2$, and optionally Fe can be replaced partially or entirely by one or more transition metals, including Cr.

In one embodiment the additional phase comprises $Gd_4Al_2O_9$.

In yet another embodiment the additional phase comprises alumina ($Al_2O_3$).

In one embodiment at least one of the at least one underlying layer comprises a zirconia based phase, preferably a zirconia based oxide.

In one embodiment at least one of the at least one underlying layer comprises yttria stabilized zirconia (YSZ).

In another embodiment at least one of the at least one underlying layer comprises a zirconate pyrochlore ($A_2Zr_2O_7$), where A is preferably one or more elements from the lanthanide series (La→Lu).

In one embodiment at least one of the at least one underlying layer comprises one of $La_2Zr_2O_7$, $Nd_2Zr_2O_7$, $Sm_2Zr_2O_7$ or $Gd_2Zr_2O_7$.

In another embodiment at least one of the at least one underlying layer comprises a pyrochlore ($A_2B_2O_7$), where A is preferably one or more elements from the lanthanide series (La→Lu) or the actinide series (Ac→Lr) and B is preferably one or more elements from the group of transition metals.

In one embodiment at least one of the at least one underlying layer comprises $La_2Ce_2O_7$.

In a further embodiment at least one of the at least one underlying layer comprises a magnetoplumbite ($AB_{1+x}C_xAl_{11-2x}O_{19}$), where A is preferably one or more elements from La→Gd, B is preferably one or more elements from Mg, Sr, and Mn→Zn, C is preferably one of Ti and Si, and $0<x<5.5$.

In one embodiment at least one of the at least one underlying layer comprises $LaMgAl_{11}O_{19}$.

In a still further embodiment at least one of the at least one underlying layer comprises a monazite ($APO_4$), where A is at least one of La, Ce, Pr, Nd, Th and Y.

In one embodiment at least one of the at least one underlying layer comprises $LaPO_4$.

In a yet further embodiment at least one of the at least one underlying layer comprises a garnet.

In one embodiment at least one of the at least one underlying layer comprises a yttrium aluminium garnet (YAG) ($Y_3Al_xFe_{5-x}O_{12}$), where $0<x<5$, and optionally Fe can be replaced partially or entirely by one or more transition metals, including Cr.

In one embodiment at least one of the at least one underlying layer comprises $Y_3Al_5O_{12}$.

In another embodiment at least one of the at least one underlying layer comprises a gadolinium aluminium garnet (GAG) ($Gd_3Al_xFe_{5-x}O_{12}$), where $0<x<5.5$, and optionally Fe can be replaced partially or entirely by one or more transition metals, including Cr.

In one embodiment at least one of the at least one underlying layer comprises $Gd_3Al_5O_{12}$.

In still another embodiment at least one of the at least one underlying layer comprises a perovskite.

In one embodiment at least one of the at least one underlying layer comprises a yttrium aluminium perovskite (YAP) ($YAl_xFe_{1-x}O_3$), where $0<x<1$, and optionally Fe can be replaced partially or entirely by one or more transition metals, including Cr.

In one embodiment at least one of the at least one underlying layer comprises $YAlO_3$.

In another embodiment at least one of the at least one underlying layer comprises a gadolinium aluminium perovskite (GAP) ($GdAl_xFe_{1-x}O_3$), where $0<x<1$, and optionally Fe can be replaced partially or entirely by one or more transition metals, including Cr.

In one embodiment at least one of the at least one underlying layer comprises $GdAlO_3$.

In yet still another embodiment at least one of the at least one underlying layer comprises a monoclinic.

In one embodiment at least one of the at least one underlying layer comprises a yttrium aluminium monoclinic (YAM) ($Y_4Al_xFe_{2-x}O_9$), where $0<x<2$, and optionally Fe can be replaced partially or entirely by one or more transition metals, including Cr.

In one embodiment at least one of the at least one underlying layer comprises $Y_4Al_2O_9$.

In another embodiment at least one of the at least one underlying layer comprises a gadolinium aluminium monoclinic (GAM) ($Gd_3Al_xFe_{2-x}O_9$), where $0<x<2$, and optionally Fe can be replaced partially or entirely by one or more transition metals, including Cr.

In one embodiment at least one of the at least one underlying layer comprises $Gd_4Al_2O_9$.

In one embodiment the outer surface layer and the at least one underlying layer are formed of different materials.

In another embodiment the outer surface layer and the at least one underlying layer are formed of the same material.

In one embodiment the outer surface layer includes at least one luminescent dopant.

In one embodiment the additional phase includes at least one luminescent dopant.

In one embodiment the at least one luminescent dopant is from the lanthanide series (La, Ce, Pr, Nd, Pm, Sm, Eu, Gd, Tb, Dy, Ho, Er, Tm, Yb and Lu).

In one embodiment the TBC includes a single underlying layer.

In another embodiment the TBC includes a plurality of underlying layers.

In one embodiment the component further includes a bondcoat between a surface of the component and the TBC.

In another aspect the present invention provides a component coated with a thermal barrier coating (TBC), wherein the TBC includes an outer surface layer, wherein the outer surface layer has a thickness of not more than 50% of a thickness of the TBC and includes an additional phase.

In a further aspect the present invention provides a component coated with a thermal barrier coating (TBC), wherein the TBC includes an outer surface layer and at least one underlying layer, wherein the outer surface layer has a lower average porosity than the at least one underlying layer and includes an additional phase.

In one embodiment the additional phase is a sintering agent which promotes sintering of the outer surface layer.

The present invention also extends to a machine including one or more of the above-described components.

In a still further aspect the present invention provides a method of operating the above-described machine, comprising the step of: exposing the TBC to a thermal environment, wherein the TBC has an increased lifetime as compared to an equivalent TBC including no additional phase.

In one embodiment the step of exposing the TBC to a thermal environment comprises the step of: exposing the TBC to a thermal environment having a temperature of more than 1200 C, wherein the component is at a temperature of less than 1200 C, and preferably less than 1000 C.

In one embodiment the step of exposing the TBC to a thermal environment comprises the step of: repeatedly exposing the TBC to a thermal environment.

In a yet further aspect the present invention provides a method of manufacturing the above-described component, comprising the step of: depositing the TBC by one of air plasma spraying (APS), physical vapor deposition (PVD), including electron beam physical vapor deposition (EBPVD), directed vapor deposition (DVD), including electron beam directed vapor deposition (EBPVD), chemical vapor deposition (CVD), including electron assisted chemical vapor deposition (EACVD), flame spraying, arc sputter coating, dip coating or sol-gel coating.

In one embodiment the air plasma spraying is performed by mixing the additional phase with a primary phase prior to feeding to a spray gun.

In one embodiment the air plasma spraying is performed by separately feeding a primary phase and an additional phase in appropriate proportions to a spray gun.

In one embodiment the at least one underlying layer and the outer surface layer are deposited by electron beam physical vapor deposition.

In one embodiment the deposition step comprises the step of: sequentially evaporating inner and outer layers using a multiple evaporation source system.

In another embodiment the deposition step comprises the steps of: evaporating an inner layer; removing and replacing a source material; and evaporating an outer layer.

In one embodiment the evaporation is performed at temperatures of between 900 and 1100 C in an oxygen containing environment.

In a particularly preferred embodiment the present invention has application to YSZ/YAG systems.

In the prior art, it is known that the addition of secondary phases to YSZ in low volume levels or weight percentage levels can change the overall properties of a TBC formed therefrom.

Further, while YAG is regarded as a potential candidate for TBCs, there are limitations to its use. Notably, YAG can potentially react with the bondcoat, and Gentleman et al [9] discloses that YAG is not compatible with zirconia, and thus is not suitable in combination with classical TBC systems.

Following is an overview of the prior art with regard to the use of YAG materials for TBCs and highlights the distinction vis-à-vis the present invention.

Padture et al [2,3] discloses the use of YAG based ceramics as TBCs.

In contrast, the present invention encompasses the use of a YSZ/YAG mixture, as a multi-phase material, integrated as a layer, preferably a surface layer, of a TBC. As this ceramic-ceramic composite layer has no direct contact with the bondcoat or the thermally-grown oxide, the TBC system is not de-stabilised.

DE-A-10200803[6] discloses a method of producing TBC materials which have a reduced sintering tendency, by incorporating a pyrochlore from $La_2Zr_2O_7$, $Gd_2Zr_2O_7$, $Nd_2Zr_2O_7$, $Sm_2Zr_2O_7$, $Eu_2Zr_2O_7$, $La_2Hf_2O_7$ or a mixture thereof in an amount between 0.1 vol % and 50 vol % in admixture with partially or fully stabilised zirconias, perovskites, spinels, mullites, cerium compounds or defective fluorite compounds. The decreased sintering tendency of the material is disclosed as being beneficial to TBCs.

In contrast, the present invention provides oppositely for materials which exhibit an increased sintering tendency. The teaching of DE-A-10200803 clearly provides that the durability of TBCs is improved by reducing the sintering tendency, and yet experimental results confirm that the TBC of the present invention shows improved surface durability, particularly under temperature gradient conditions.

A reduction in sintering tendency, as described in DE-A-10200803, also reduces the ability of a material to self-heal, meaning that cracks formed by thermo-mechanical stresses cannot be repaired by subsequent sintering when exposed to high temperatures, typically above 1000 C. This becomes more relevant as the TBCs are exposed to high-temperature gradients where the surface of the TBC is exposed to ultra-high temperatures, typically above 1250 C, and the underlying material, which adheres to a component, is at a much lower temperature.

U.S. Pat. No. 6,106,959[5] discloses a multi-layer TBC which comprises an outer layer formed of hafnia stabilized zirconia, scandia stabilized zirconia or YAG, and at least one underlying layer formed of YSZ.

In contrast, the present invention encompasses the use of a YSZ/YAG mixture, as a multi-phase material, integrated as a layer, preferably a surface layer, of a TBC.

U.S. Pat. No. 6,677,064 [4] discloses a multi-phase ceramic TBC for the use in high-temperature environments exceeding 1200 C. The TBC comprises a ceramic single or two oxide base layer disposed on a substrate surface and a ceramic oxide reaction product material disposed on the base layer, the reaction product comprising the reaction product of the base layer with the ceramic single or two oxide overlay layer.

U.S. Pat. No. 6,677,064 requires that the base layer and the overlay layer are chemically reacted by heating the reactants to a temperature in the region of 1200-1500 C. The overlay layer is thereby transformed into a new overlay phase/material. In contrast to the structure disclosed in U.S. Pat. No. 6,677,064, the present invention does not require a separate chemical reaction step. The YAG-YSZ layer is formed during manufacturing without requiring a subsequent chemical reaction step.

Further, U.S. Pat. No. 6,677,064 requires control of an 'infiltration depth' of the reaction layer. Since the present invention does not have a reaction layer, there will be no infiltration nor there is a need to control an 'infiltration depth'. Thus, the TBC of the present invention is easier to apply and also forms a differently structured system.

U.S. Pat. No. 6,677,064 discloses the formation of a YAG layer as an overlay layer on top of a YSZ base layer. The YAG layer is, however, a single phase material. There is no disclosure of an outer layer which comprises a multiphase material.

Furthermore, most importantly, U.S. Pat. No. 6,677,064 discloses that the reaction products should be selected to be phase stable at high temperatures and have a low sintering tendency. In the present invention, and in direct contrast, the YAG acts as a sintering agent and the material of the outer surface layer is provided specifically to exhibit an increased sintering tendency.

WO-A-2007/023293, the applicant's earlier publication, discloses a YSZ/YAG multiphase material for luminescence sensing. There is, however, no disclosure of a multi-layer TBC of the kind of the present invention.

Su et al [1] discloses the incorporation of a YAG layer into a YSZ layer and reports excessive porosity in the YAG layer, which provides for a beneficial reduction in thermal conductivity. It is further disclosed that the YAG layer shows amorphous areas which are beneficial to reduce thermal conductivity. It is further disclosed that integrating YAG as a single layer between two YSZ layers reduces the oxidation rate of the bondcoat by a factor of three. This is because the YAG acts as an oxidation barrier. It is also reported that, after exposing the YAG-YSZ multi-layer system to a high temperature (up to 1200 C) and isothermal cycling, no phase reaction between the YAG-YSZ materials can be observed.

In contrast, the present invention is not directed to an isotropic, homogeneous layer of YAG onto or inside a TBC as a 'sandwich' layer. Tests carried out by the present inventors have revealed that the application of a single-phase YAG layer to a YSZ layer exhibits reduced survivability when exposed to high-temperature gradient cycling, as is experienced by coatings in gas turbines. The present invention provides that a layer of a mixed YSZ/YAG material on top of a standard YSZ layer improves the durability of the coating system when exposed to very high-temperature cycling.

Wu et al [7] discloses a YAG layer for use as a TBC and as a luminescence indicator, which is deposited using ESAVD. There is, however, no disclosure of the use of a multi-phase material or a multi-layer coating architecture, and moreover makes no disclosure of any improved durability of the TBC at elevated temperatures in contrast to the present invention.

WO-A-2000/006796, the applicant's earlier publication, discloses the provision of luminescent materials in TBCs to enable in situ optical measurement of characteristics of TBCs, in particular the temperature of TBCs. There is no disclosure of a multi-layer TBC of the kind of the present invention, which provides for improved durability of the TBC, particularly at extreme conditions as compared to standard materials.

In contrast to the understanding of the person skilled in the art, the present inventors have surprisingly identified that providing for increased sintering in an upper surface layer of a TBC leads to improved thermal gradient cycling behaviour as compared to standard TBCs, particularly when exposed to temperatures greater than 1200 C.

The present invention provides for improved durability under temperature gradient cycling conditions, particularly as compared to standard TBCs. This enables TBCs to run at higher temperatures for longer periods, which increases fuel efficiency and reduces $CO_2$ emissions.

In summary, the present invention relates to compositions of ceramic materials which have an increased tendency to sinter. As discussed above, most surprisingly, these materials improve the thermal stability of TBCs, which leads to improved high-temperature properties.

BRIEF DESCRIPTION OF THE DRAWINGS

Preferred embodiments of the present invention will now be described hereinbelow by way of example only with reference to the accompanying drawings, in which:

FIG. 1 illustrates one inventive component sample in accordance with Example #1;

FIG. 2 illustrates a micrograph of a vertical section through the component sample of FIG. 1;

FIG. 7 illustrates the same sectional micrograph as FIG. 5, where including a second sampling region (Sample Area #2) in the lower YSZ layer;

FIG. 8 illustrates a micrograph of section of a ceramic formed by air plasma spaying (APS) a YSZ (90 wt %)/YAG:Dy (10 wt %) mixture;

FIG. 9 illustrates one inventive component sample in accordance with Example #2; and FIG. 10 illustrates one inventive component sample in accordance with Example #3.

EXAMPLES

The present invention will now be described with reference to the following non-limiting Examples.

Example #1

In this Example, inventive component samples were prepared by air plasma spaying (APS) a TBC onto a substrate (here a circular disc), comprising a first, lower layer of only YSZ and a second, upper layer of a YSZ (90 wt %)/YAG:Dy (10 wt %) mixture.

Figure 3:
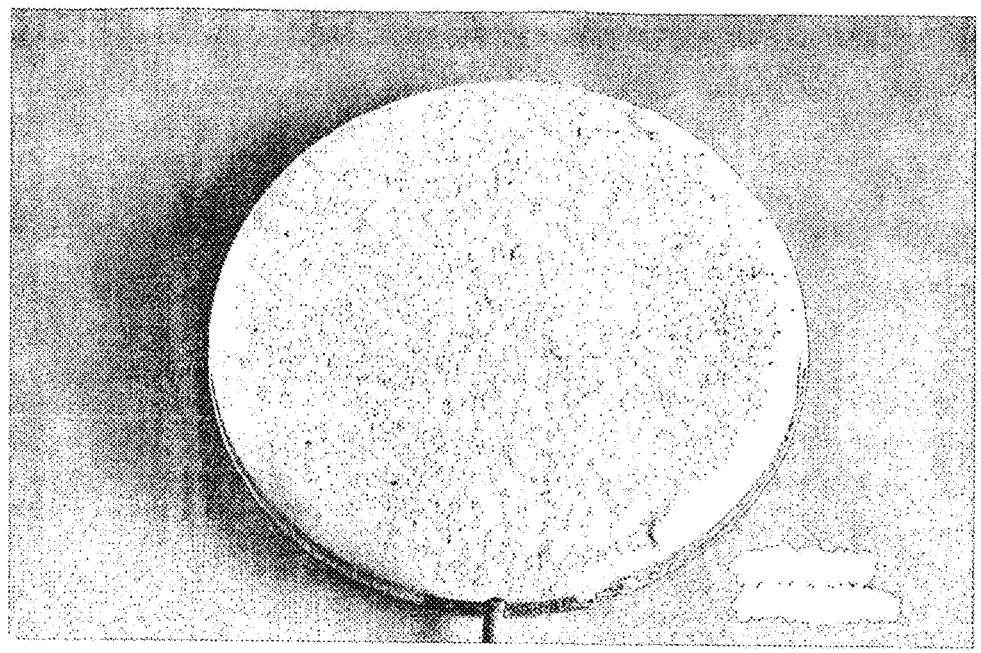
FIG. 3 illustrates a comparative component sample.
Figure 4:
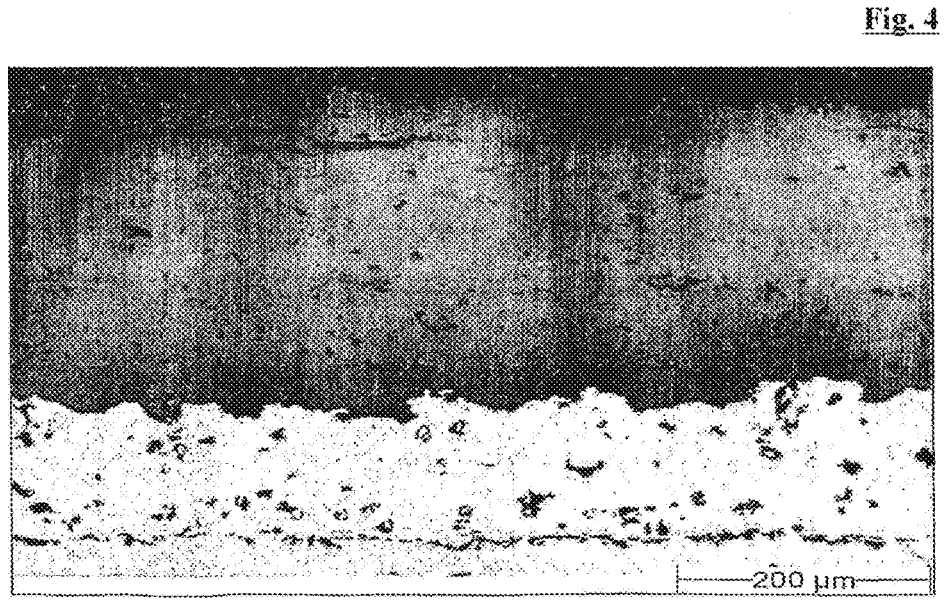
FIG. 4 illustrates a micrograph of a vertical section through the comparative component sample of FIG. 3.

FIGS. 1 and 2 illustrate one inventive component sample which has been subjected to 850 high-temperature (1200 C) thermal gradient cycles. As can be observed, the upper surface of the TBC is intact and exhibits no delamination. In comparison, FIGS. 3 and 4 illustrate a comparative component sample, in which the TBC is formed only of YSZ and has been subjected to the same thermal cycling regime as the inventive component sample. In contrast, the TBC of this comparative component sample exhibits delamination at the upper surface.

Figure 5:
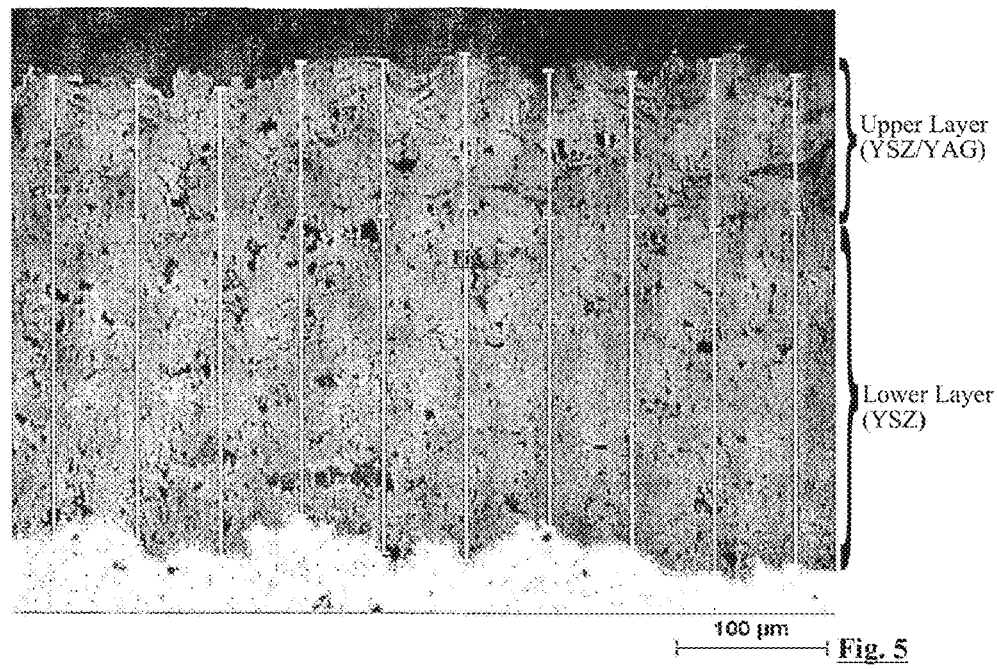
FIG. 5 illustrates a micrograph of a vertical section through another inventive component sample in accordance with Example #1.

FIG. 5 illustrates a vertical sectional micrograph of another inventive component sample, showing the thicknesses of the lower and upper layers, with the lower YSZ layer having an average thickness of 218 μm and the upper YSZ/YAG layer having an average thickness of 94 μm.

Figure 6:
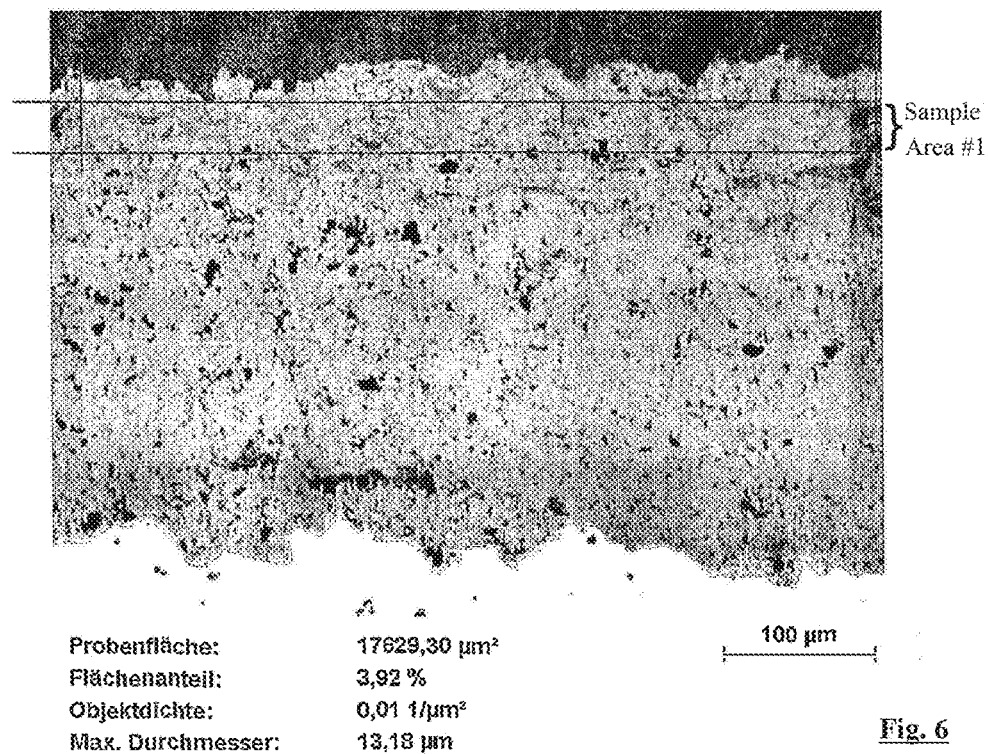
FIG. 6 illustrates the same sectional micrograph as FIG. 5, where including a first sampling region (Sample Area #1) in the upper YSZ/YAG layer.

FIG. 6 illustrates the same sectional micrograph as FIG. 5, where including a first sampling region (Sample Area #1) in the upper YSZ/YAG layer. In this inventive sample component, the upper YSZ/YAG layer is determined to have an average porosity of 3.92%, with a maximum pore diameter of 13.18 μm.

FIG. 7 illustrates the same sectional micrograph as FIG. 5, where including a second sampling region (Sample Area #2) in the lower YSZ layer. In this inventive sample component, the lower YSZ layer is determined to have an average porosity of 14.97%, with a maximum pore diameter of 24.11 μm.

As can be observed, the upper YSZ/YAG layer has a low average porosity at about 4%. As discussed above, the skilled person would have considered such a low average porosity to be detrimental to the performance of the TBC, and yet this TBC exhibits much improved thermal stability/durability as compared to the counterpart conventional TBC.

FIG. 8 illustrates a sectional micrograph of a ceramic formed by air plasma spaying (APS) a YSZ (90 wt %)/YAG:Dy (10 wt %) mixture.

Example #2

In this Example, inventive component samples were prepared by air plasma spaying (APS) a TBC onto a substrate (here a circular disc), comprising a first, lower layer of only YSZ and a second, upper layer of a YSZ (80 wt %)/YAG:Dy (20 wt %) mixture.

FIG. 9 illustrates a vertical sectional micrograph of one inventive component sample. As can be observed, the upper YSZ/YAG layer has a lower average porosity and thickness as compared to the lower YSZ layer.

Example #3

In this Example, inventive component samples were prepared by air plasma spaying (APS) a TBC onto a substrate (here a circular disc), comprising a first, lower layer of only YSZ and a second, upper layer of a YSZ (95 wt %)/YAG:Tm (5 wt %) mixture.

FIG. 10 illustrates a vertical sectional micrograph of one inventive component sample. As can be observed, the upper YSZ/YAG layer has a lower average porosity and thickness as compared to the lower YSZ layer.

While a high porosity is desired to reduce thermal conductivity, the present invention, in contrast to this common understanding, provides a less porous outer surface layer. It would be expected that this material is less suited as a TBC than standard high-porosity materials. However, most remarkably, this material shows improved durability.

Further, standard TBCs and advanced TBCs will aim for high porosity to reduce the thermal conductivity, and, even then, to some extent, will show cracking, ideally vertical cracks, to release energy and provide more strain tolerance when exposed to thermal cycling. A ceramic layer which is formed by sintering on an upper surface will form a denser 'ceramic block' which will not be able to respond to thermal cycling by forming cracks or by using the voids of the porous material. Consequently, adding a sintering agent to the TBC material as provided by the present invention is counter-intuitive, given that TBCs are required to exhibit high strain tolerance.

The structure of the present invention, when being used in a thermal gradient and under cycling conditions (heating up and cooling down of the TBC), exhibits improved durability in terms of spallation properties as compared to standard TBCs tested under the same conditions.

This can be potentially explained by the low number of pores available in the surface region, which, when cycled, form the nuclei for horizontal cracks which propagate through the ceramic coating when exposed to heating and cooling cycles. These growing cracks would lead to spallation, in particular in the surface region and thus thinning of the TBC, and consequently would increase the temperature at the bondcoat of the TBC system. An increased bondcoat temperature, however, would increase the growth of the oxide layer, and consequently would lead to crack formation at the bondcoat and delamination of the entire coating system.

The present invention reduces surface spallation and thinning of the top layer of such a TBC system by having reduced porosity. Consequently, this will enable running of the TBC for longer periods at higher temperatures without delamination of the top layers and bondcoat layers.

Finally, it will be understood that the present invention has been described in its preferred embodiments and can be modified in many different ways without departing from the scope of the invention as defined by the appended claims.

REFERENCES

[1] Su, Y. J., Trice, R. W., Faber, K. T., Wang, H. and Porter, W. D., "Thermal Conductivity, Phase Stability and Oxidation Resistance of $Y_3Al_5O_{12}$ (YAG)/$Y_2O_3$—$ZrO_2$ (YSZ) Thermal-Barrier Coatings", *Oxidation of Metals*, 61 (3-4), pages 253-271 (2004).
[2] U.S. Pat. No. 6,015,630
[3] Padture, N. P. and Klemens, P. G., "Low Thermal Conductivity in Garnets", *Journal of the American Ceramic Society*, 80 (4), pages 1018-1020 (1997).
[4] U.S. Pat. No. 6,294,260
[5] U.S. Pat. No. 6,106,959
[6] DE-A-10200803,
[7] Wu, Y., Du, J. and Choy, K. L., "Novel Deposition of Columnar $Y_3Al_5O_{12}$ Coatings by Electrostatic Spray-Assisted Vapor Deposition", *Journal of the American Ceramic Society*, 89 (1), pages 385-387 (2006).
[8] WO-A-2007/023293
[9] Gentleman, M. M. and Clarke, D. R., "Concepts for Luminescence Sensing of Thermal Barrier Coatings", *Surface and Coatings Technology*, 188-189, pages 93-100 (2004).
[10] WO-A-2000/006796

The invention claimed is:

1. A component coated with a thermal barrier coating (TBC), wherein the TBC includes an outer surface layer and at least one underlying layer, wherein the outer surface layer has a thickness of at least 20% and not more than 50% of a thickness of the TBC, the outer surface layer has a lower average porosity than the at least one underlying layer the outer surface layer includes between 1 wt % and 20 wt % of an additional phase therewithin, the outer surface layer comprises yttria stabilized zirconia, the additional phase comprises yttrium aluminum garnet, yttrium aluminum monoclinic or yttrium aluminum peroskite, and the at least one underlying layer comprises yttria stabilized zirconia.

2. The component of claim 1, wherein the additional phase acts as a sintering agent which confers an increased sintering tendency to the TBC when exposed to a high-temperature thermal environment.

3. The component of claim 1, wherein the outer surface layer has an average porosity of less than 10%.

4. The component of claim 1, wherein the at least one underlying layer has an average porosity of more than 10%.

5. The component of claim 1, wherein the outer surface layer has a thickness of at least 30% of a thickness of the TBC.

6. The component of claim 1, wherein the outer surface layer has a thickness of at least 15 µm.

7. The component of claim 1, wherein the outer surface layer has an average porosity of less than 5%.

8. The component of claim 1, wherein the at least one underlying layer has an average porosity of more than 15%.

9. The component of claim 1, wherein the outer surface layer has a thickness of at least 40% of a thickness of the TBC.

10. The component of claim 1, wherein the outer surface layer includes between 5 wt % and 20 wt % of the additional phase.

* * * * *